(12) United States Patent
Tamai et al.

(10) Patent No.: US 7,607,293 B2
(45) Date of Patent: Oct. 27, 2009

(54) INTAKE MANIFOLD PRESSURE CONTROL APPARATUS AND METHOD FOR A HYBRID PROPULSION SYSTEM

(75) Inventors: Goro Tamai, West Bloomfield, MI (US); William L. Aldrich, III, Davisburg, MI (US); Nathaniel S. Epperly, Kimball, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 337 days.

(21) Appl. No.: 11/284,526

(22) Filed: Nov. 21, 2005

(65) Prior Publication Data
US 2007/0117667 A1    May 24, 2007

(51) Int. Cl.
*F01N 3/00* (2006.01)
(52) U.S. Cl. .................. 60/289; 60/274; 123/179.16; 123/179.18; 123/179.3; 180/65.2
(58) Field of Classification Search ............ 60/274, 60/289, 290, 307; 123/179.16, 179.18, 179.3; 123/685; 180/65.2, 65.3, 65.4
See application file for complete search history.

(56) References Cited
U.S. PATENT DOCUMENTS

| | | | | |
|---|---|---|---|---|
| 5,560,199 | A * | 10/1996 | Agustin et al. ............... 60/274 |
| 6,094,909 | A * | 8/2000 | Weber et al. ................. 60/280 |
| 6,647,326 | B2 * | 11/2003 | Nakamori et al. ............. 701/22 |
| 6,647,712 | B2 * | 11/2003 | Hiller et al. ................. 60/289 |
| 6,656,083 | B2 * | 12/2003 | Esaki ............................ 477/5 |
| 6,735,942 | B2 * | 5/2004 | Wild et al. ................... 60/397 |
| 6,763,803 | B2 * | 7/2004 | Wild et al. ................. 123/361 |
| 6,863,048 | B2 * | 3/2005 | Burkhard et al. ........... 123/325 |
| 6,883,323 | B2 * | 4/2005 | Hummel ..................... 60/606 |
| 7,128,035 | B2 * | 10/2006 | Lancaster et al. ...... 123/179.18 |

\* cited by examiner

*Primary Examiner*—Tu M Nguyen
(74) *Attorney, Agent, or Firm*—Quinn Law Group, PLLC

(57) ABSTRACT

Provided is an intake manifold pressure control apparatus, or vacuum pump, for a hybrid propulsion system. The vacuum pump is operable to evacuate the intake manifold of an internal combustion engine, thereby lowering the Manifold Absolute Pressure, or MAP, to a predetermined level to enable a quick restart of the internal combustion engine. This vacuum pump may also be used to evacuate hydrocarbons, or HCs, from within the intake system to prevent evaporative emissions from the intake manifold upon engine shutdown. In the preferred embodiment, the vacuum pump is operated by a motor that can simultaneously operate an auxiliary transmission oil pump. Additionally, the present invention provides a method of controlling the hybrid propulsion system to enable the manifold pressure control apparatus to lower the MAP value within the intake manifold as well as a method of evacuating HCs from the intake manifold upon engine shutdown.

5 Claims, 2 Drawing Sheets

INTAKE MANIFOLD PRESSURE CONTROL APPARATUS AND METHOD FOR A HYBRID PROPULSION SYSTEM

TECHNICAL FIELD

The present invention relates to an apparatus and method of controlling the pressure within an intake manifold of an internal combustion engine contained within a hybrid propulsion system.

BACKGROUND OF THE INVENTION

With the current desire for fuel efficient and low emission vehicles, many novel solutions for internal combustion engine architecture and operating strategy have been developed. One such idea is the Belt Alternator Starter (BAS) hybrid propulsion system. This system provides increased fuel economy by shutting off the engine when at an idle operating mode, or idle stop, and enabling early fuel cut-off during decelerations. The BAS hybrid propulsion system can also accommodate regenerative braking. The hybrid propulsion system combines engine controls with a combined alternator/starter motor, or motor/generator. This hybrid strategy has minimal impact on engine and transmission architectures when compared to other hybrid strategies.

A typical automotive accessory drive system consists of a drive pulley connected to an output shaft of the engine, usually the crankshaft. Wrapped around this pulley is a flexible drive belt, which in turn is wrapped around a plurality of driven pulleys. This flexible drive belt transmits drive forces between the drive pulley and the driven pulleys. The driven pulleys may be fixably attached to accessories known in the art, such as a power steering pump, air conditioning compressor, alternator, and secondary air pump. However, some of these driven pulleys may be idler pulleys which may be used to ensure proper belt wrap of a given driven pulley or they may be used to ensure proper belt routing.

The hybrid propulsion system employs a motor/generator mounted with respect to the other components of the accessory drive system. The motor/generator can be mounted in effectively the same way and in effectively the same packaging space as a traditional alternator. The hybrid propulsion system must be able to effect a quick restart of the engine.

When a request is made to restart the engine, usually by depressing the accelerator pedal or releasing the brake pedal, the driven pulley mounted to the motor/generator will impart, to the output shaft, the rotational force necessary to rotate or "crank" the engine via the flexible drive belt. Traditional hybrid propulsion systems employ an auxiliary transmission oil pump to maintain fluid pressure within the transmission during the idle stop mode of operation. This is necessary to ensure that the torque transmitting mechanisms remain engaged when the mechanical oil pump operation is discontinued upon engine shut down.

SUMMARY OF THE INVENTION

In view of the foregoing, provided is a hybrid propulsion system having an internal combustion engine with an intake system having an intake manifold operable to provide air to the internal combustion engine. A vacuum pump is provided in communication with the intake system and operable to substantially evacuate the intake manifold thereby lowering the pressure within the intake manifold relative to atmospheric pressure.

The vacuum pump may be operated by a motor. The hybrid propulsion system may further include a transmission and an auxiliary transmission oil pump operable to provide fluid pressure to the transmission when the internal combustion engine is shut off. The motor may be operable to substantially simultaneously operate the auxiliary transmission oil pump and the vacuum pump. The hybrid propulsion system of the present invention may also include an exhaust system in communication with the internal combustion engine. The vacuum pump may discharge into the exhaust system, preferably upstream of a catalytic converter. Additionally, the hybrid propulsion system may further include an evaporative emissions purge canister in communication with the intake system via a canister purge valve. The vacuum pump may discharge into the canister purge valve. The hybrid propulsion system of the present invention may further include a hydrocarbon adsorber provided within the intake system. The vacuum pump may discharge into the hydrocarbon adsorber.

Yet another aspect of the present invention provides a method of controlling a hybrid propulsion system having a transmission, an internal combustion engine, an ignition switch operable to shut off the internal combustion engine, and an intake system in communication with the internal combustion engine. The intake system of the hybrid propulsion system includes an intake manifold. The method includes providing the hybrid propulsions system with a vacuum pump in communication with the intake system. Subsequently it is determined if the internal combustion engine is running and the state of the ignition switch. Thereafter the vacuum pump is operated to substantially lower the pressure within the intake manifold when the internal combustion engine is not running and the ignition switch is on. Subsequently, the operation of the vacuum pump is discontinued when the internal combustion engine is started.

The method of controlling a hybrid propulsion system in which the intake system further includes a throttle blade may further include closing the throttle blade while the vacuum pump is operating. The method may further include providing an auxiliary transmission oil pump operable to maintain fluid pressure within the transmission when the internal combustion engine is shut off. A motor operable to simultaneously drive the auxiliary transmission oil pump and the vacuum pump may also be provided. The method of the present invention may also include lowering the pressure within the intake manifold to substantially 60 KPa or less prior to starting the internal combustion engine.

Yet another method of controlling a hybrid propulsion system having a transmission, an internal combustion engine, an ignition switch operable to shut off the internal combustion engine, and an intake system in communication with the internal combustion engine is provided. The intake system of the hybrid propulsion system includes an intake manifold. The method includes providing the hybrid propulsion system with a vacuum pump in communication with the intake system. Subsequently it is determined if the internal combustion engine is running and the state of the ignition switch. The vacuum pump is operated to substantially evacuate the intake system of hydrocarbons for evaporative emission reduction when the internal combustion engine is not running and the ignition switch is off.

The method of the present invention may also include discontinuing the operation of the vacuum pump when the internal combustion engine is restarted or the duration of the vacuum pump has exceeded a predetermined calibrated limit. Additionally the method may include providing an auxiliary transmission oil pump operable to maintain fluid pressure within the transmission when the internal combustion engine is shut off. A motor may drive the vacuum pump and the auxiliary transmission oil pump simultaneously.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
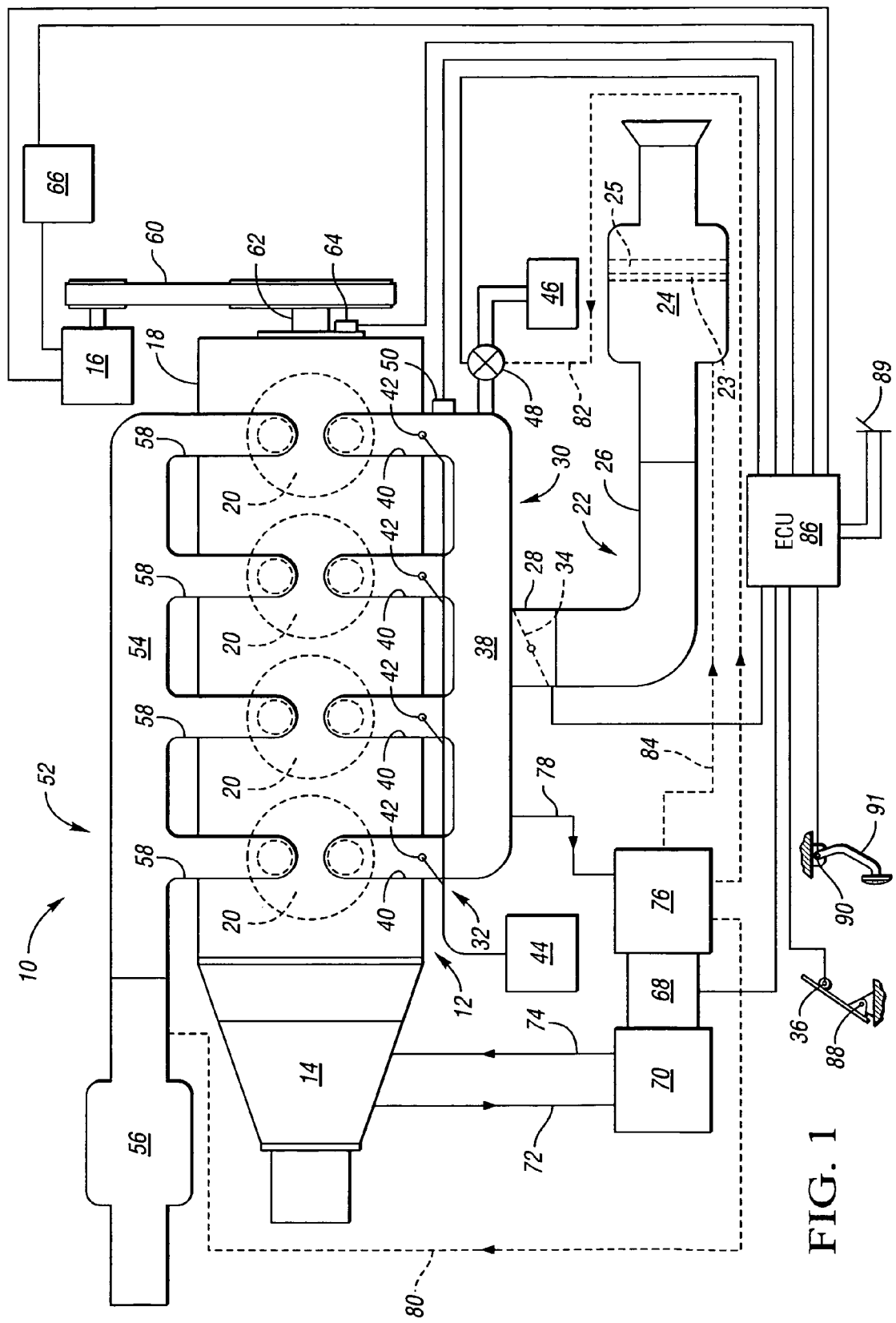
FIG. 1 is a schematic diagrammatic view of a hybrid propulsion system illustrating the aspects of the present invention.

FIG. 1 shows a hybrid propulsion system 10 having an engine 12, a transmission 14, and a combined alternator/starter or motor/generator 16. The engine 12 is an internal combustion engine such as a spark ignited engine. The engine 12 includes a cylinder case 18 defining a plurality of cylinders 20, each operable to receive a piston (not shown) for reciprocal motion therein.

An intake system 22 is operable to provide or convey air or an air-fuel mixture to the cylinders 20. The intake system 22 includes an airbox 24, duct 26, throttle body 28, intake manifold 30, and fuel injection system 32. The airbox 24 includes a filter element 25 for filtering particulate matter from the air and also includes a hydrocarbon, or HC, adsorber 23 operable to store an amount of HC which will subsequently be delivered to, and burned by, the engine 12. The duct 26 connects the airbox 24 with the throttle body 28. The throttle body controls the amount of air allowed to pass to the engine 12. A throttle blade 34 is provided within the throttle body 28 and is configured to rotate though approximately ninety degrees from a 'closed' position nearly perpendicular to the air stream thereby completely blocking the flow of air, to an 'open' position, parallel to the air stream, thereby allowing nearly unrestricted flow. The position of the throttle blade 34 is controlled either mechanically or electrically by the position of an accelerator pedal 36.

The intake manifold 30 includes a plenum portion 38 having a plurality of runner portions 40 operable to convey air from the plenum portion 38 to the respective cylinder 20. Each of the runner portions 40 receives a fuel injector 42 which delivers a metered amount of substantially atomized fuel into the respective runner portion 40 for delivery to the respective cylinder 20. A pressurized fuel source 44, such as a fuel pump and tank, will provide pressurized fuel to the fuel injectors 42. The plenum portion 38 is in selective communication with an evaporative emission purge canister 46 through a canister purge valve 48. The canister purge valve 48 introduces HCs trapped within the purge canister 46 to the plenum portion 38 for subsequent introduction to, and burning by, the engine 12 upon start up. A Manifold Absolute Pressure (MAP) sensor 50 is disposed within the plenum portion 38 and provides a reading of the pressure value within the intake manifold 30. The MAP sensor 50 may also be equipped with a thermocouple to provide a measurement of air temperature within the intake manifold 30.

An exhaust system 52 is provided having an exhaust manifold 54 and a catalytic converter 56. The exhaust manifold 54 has a plurality of runners 58 operable to exhaust the products of combustion from the cylinders 20. The catalytic converter 56 may be a three-way catalyst, the operation of which is known in the art, which is operable to reduce pollutants within the exhaust stream.

The engine 12 is connected, through an output shaft 62, in parallel with the motor/generator 16 via a coupling 60. The coupling 60 may be a belt and pulley system or a gear drive system. The output shaft 62 in the present embodiment is the crankshaft of the engine 12. The rotational speed of the output shaft 62, and therefore the engine 12, is measured by a position sensor 64. The motor/generator 16 draws power from a power source 66 when operating as a starter motor for the engine 12, and when the motor/generator 16 provides power to the engine 12. Alternately, the coupling 60 allows the motor/generator 16 to be driven by the engine 12 to allow the motor/generator 16 to provide power to the power source 66.

The transmission 14 is preferably an automatically shiftable power transmission. The transmission 14 utilizes a plurality of fluid operated torque transmitting mechanisms such as clutches and brakes to selectively engage members of a planetary gearset to effect gear ratio interchanges. A motor 68 drives an auxiliary transmission oil pump 70. A sump or reservoir, not shown, of the transmission 14 communicates fluid to the auxiliary transmission oil pump 70 via a passage 72. The pressurized fluid exiting the auxiliary transmission oil pump 70 is returned to the transmission 14 via a passage 74 to maintain fluid pressure, and therefore torque transmitting mechanism engagement, within the transmission 14 during an idle stop condition. During idle stop conditions, the engine 12 is momentarily automatically shut off when the vehicle is at rest and the engine 12 is idling. In the preferred embodiment, the motor 68 will also control a vacuum pump 76. The vacuum pump 76 is operable to evacuate the intake manifold 30 through a passage 78. By evacuating the intake manifold 30 while the engine 12 is shut off, the MAP may be reduced for ease of engine restart. Additionally, the evaporative emissions may be reduced upon engine shutdown. The vacuum pump 76 may distribute gases evacuated from the intake manifold 30 to the exhaust stream via a passage 80. Preferably, the passage 80 will introduce the evacuated gasses into the exhaust stream prior to the catalytic converter 56. The vacuum pump 76 may distribute the gasses evacuated from the intake manifold 30 to the canister purge valve 48 via a passage 82. Upon engine startup, the purge valve 48 will allow the evacuated gasses to be reintroduced to the intake manifold 30 where it is subsequently introduced to the engine 12. The vacuum pump 76 may introduce the evacuated gasses to the airbox 24 equipped with an HC adsorber 23 via a passage 84. The HCs entrained in the evacuated gases will become trapped within the HC adsorber system and are subsequently reintroduced to the engine 12 through the intake manifold 30.

An electronic control unit or ECU 86 receives input signals from various sensors such as the position sensor 64, the MAP sensor 50, an accelerator pedal position sensor 88, an ignition switch 89, and a brake pedal position sensor 90 (connected to a brake pedal 91). Additionally, the electronic control unit 86 provides output signals to control the operation of the engine 12, transmission 14, motor/generator 16, purge valve 48, and motor 68. In an electronically controlled throttle application, the electronic control unit 86 is operable to control the throttle blade 34 of the throttle body 28 using inputs from the accelerator pedal position sensor 88. The electronic control unit 86 derives electrical power from the power source 66. The electronic control unit 86 controls the operation of the hybrid BAS propulsion system 10 in accordance with a method of the present invention to be explained more fully below. The electronic control unit 86 may be a programmable microprocessor, the operation of which is well known in the art. The electronic control unit 86 can be programmed, based on either or both experimental and modeling results, to perform the functions set forth in detail below. Programming the electronic control unit 86 in such a manner will be apparent to those of skill in the art.

Figure 2:
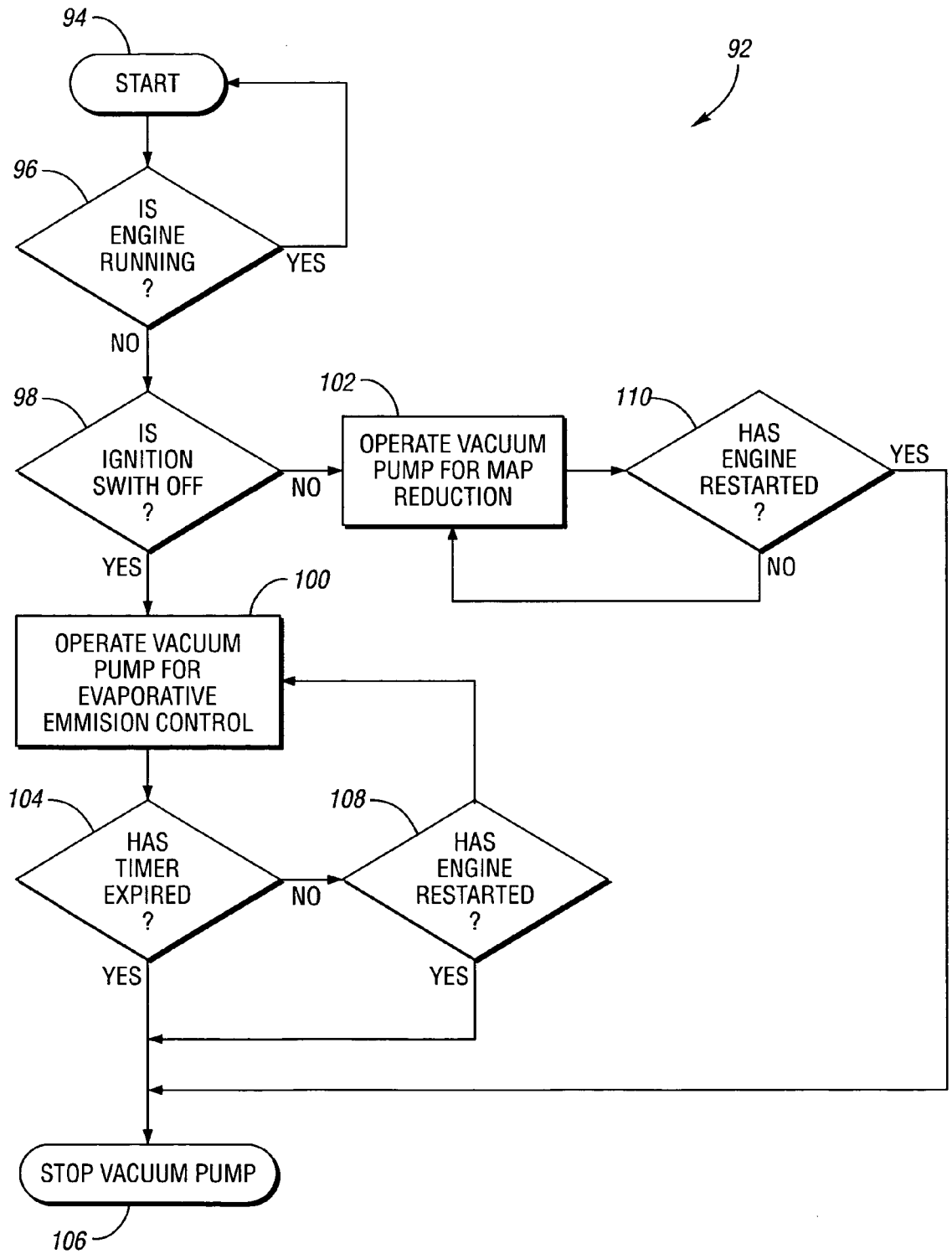
FIG. 2 schematically illustrates, in flow chart format, a method in accordance with the embodiment of the present invention for controlling pressure within an intake manifold of the hybrid propulsion system shown in FIG. 1.

FIG. 2 depicts a method 92 of controlling the motor 68 that, in the preferred embodiment, drives or operates both the auxiliary transmission oil pump 70 and the vacuum pump 76. The method 92 can best be described with reference to both FIGS. 1 and 2. The method 92 is initiated at step 94.

At step 96, the electronic control unit 86 determines the operational state of the engine 12. The electronic control unit 86 may use various inputs, such as engine speed measured by the position sensor 64, to determine whether the engine 12 is running. If the engine 12 is running, the method 92 loops back to step 94 until the electronic control unit 86 determines the engine has shut down. At this point, the method 92 will proceed to step 98.

At step 98, the electronic control unit 86 determines the state of the vehicle ignition switch 89. If the vehicle ignition switch 89 is in the off position, the operator is assumed to have shut off the engine 12 for an extended period and the method 92 will advance to step 100. Alternately, if the vehicle ignition switch 89 remains in the on position, it is assumed that the hybrid propulsion system 10 is operating in an idle stop mode and will restart momentarily when the operator releases the brake pedal 91 or depresses the accelerator pedal 36. In this case, the method 92 will advance to step 102.

At step 100, the electronic control unit 86 will operate the motor 68 to drive the auxiliary transmission oil pump 70 and the vacuum pump 76. The vacuum pump operates to extract HCs from within the intake manifold 30 for reduced evaporative emissions. The exhaust from the vacuum pump 76 may be discharged to the exhaust system 52 via the passage 80, the airbox 24 having a HC adsorber 23 via the passage 84, and/or the purge valve 48 via the passage 82. It should be noted that the auxiliary transmission oil pump 70 is not required to operate at step 100, but in the preferred embodiment, the auxiliary transmission oil pump 70 and the vacuum pump 76 are operated by the same motor 68.

At step 104, the electronic control unit 86 compares a timer value for the elapsed time of operation for the vacuum pump 76 against a calibrated time value. If the elapsed time is greater than the calibrated time value, i.e. the timer has expired, the method proceeds to step 106 where the operation of the vacuum pump 76 is discontinued. Alternately, if the elapsed time is less than or equal to the calibrated time, then the method 92 will proceed to step 108.

At step 108, the electronic control unit 86 will determine whether the engine 12 has restarted. The electronic control unit 86 may use various inputs, such as engine speed measured by the position sensor 64 and ignition switch position, to determine whether the engine 12 has restarted. If the engine 12 has not restarted, the method 92 will loop to step 100, as shown in FIG. 2. Alternately, if the engine 12 has restarted, the method 92 will proceed to step 106 thereby stopping the operation of the vacuum pump 76.

Referring back to step 102, the vacuum pump 76 will operate to lower the MAP value within the intake manifold 30 during idle stop operating conditions. This step is best performed by closing the throttle blade 34 to seal the manifold from the atmospheric pressure. By lowering the MAP value within the intake manifold 30, the engine 12 will require less torque to spin, thereby effecting an efficient restart when commanded. In the preferred embodiment, the MAP will be lowered to a value less than sixty KPa. The method 92 will then proceed to step 110. The exhaust from the vacuum pump 76 may be discharged to the exhaust system 52 via the passage 80, the airbox 24 having a HC adsorber via the passage 84, and/or the canister purge valve 48 via the passage 82. It should be noted that the auxiliary transmission oil pump 70 should be operated at step 102 to maintain hydraulic pressure within the transmission 14.

At step 110, the electronic control unit 86 will determine whether the engine 12 has restarted. The electronic control unit 86 may use various inputs, such as engine speed measured by the position sensor 64, to determine whether the engine 12 has restarted. If the electronic control unit 86 determines that the engine has not restarted, the method 92 will loop to step 102 and continue the operation of the vacuum pump 76. If the electronic control unit determines that the engine 12 has restarted, the method 92 will move to step 106 and the electronic control unit 86 will stop the operation of the vacuum pump 76.

While the best modes for carrying out the invention have been described in detail, those familiar with the art to which this invention relates will recognize various alternative designs and embodiments for practicing the invention within the scope of the appended claims.

The invention claimed is:

1. A method of controlling a hybrid propulsion system having a transmission, an internal combustion engine, an ignition switch operable to shut off the internal combustion engine, and an intake system in communication with the internal combustion engine, the intake system including an intake manifold, said method comprising:
    providing the hybrid propulsion system with a vacuum pump in communication with the intake system;
    determining if the internal combustion engine is running;
    determining the state of the ignition switch; and
    operating said vacuum pump to substantially evacuate the intake system of hydrocarbons for evaporative emission reduction when the internal combustion engine is not running and the ignition switch is off.

2. The method of controlling a hybrid propulsion system of claim 1, further comprising:
    discontinuing the operation of said vacuum pump when the internal combustion engine is restarted.

3. The method of controlling a hybrid propulsion system of claim 1, further comprising:
    discontinuing the operation of the vacuum pump when the operation for said vacuum pump has exceeded a predetermined calibrated limit.

4. The method of controlling a hybrid propulsion system of claim 1, further comprising:
    providing an auxiliary transmission oil pump operable to maintain fluid pressure within the transmission when the internal combustion engine is shut off.

5. The method of controlling a hybrid propulsion system of claim 4, further comprising:
    providing a motor, said motor being operable to simultaneously drive said auxiliary transmission oil pump and said vacuum pump.

* * * * *